United States Patent [19]

Rezac

[11] Patent Number: 4,505,634

[45] Date of Patent: Mar. 19, 1985

[54] REVOLVING FLOOR APPARATUS FOR TRAILERS

[76] Inventor: Howard D. Rezac, 403 Spencer St., Gregory, S. Dak. 57533

[21] Appl. No.: 473,853

[22] Filed: Mar. 9, 1983

[51] Int. Cl.$^3$ .............................................. B60P 1/36
[52] U.S. Cl. .................................... 414/528; 198/728
[58] Field of Search ............... 414/499, 521, 528, 679; 198/698, 748, 728

[56] References Cited

U.S. PATENT DOCUMENTS

| | | |
|---|---|---|
| 2,422,268 | 6/1947 | Symonds . |
| 2,605,913 | 8/1952 | Iton, Jr. . |
| 3,643,785 | 2/1972 | Bostedt . |
| 3,831,785 | 8/1974 | Rezac . |
| 4,072,242 | 2/1978 | Cook . |

Primary Examiner—Robert G. Sheridan
Attorney, Agent, or Firm—Merchant, Gould, Smith, Edell, Welter & Schmidt

[57] ABSTRACT

A revolving floor apparatus (10) for a trailer flat bed (12) or the like is disclosed. The revolving floor apparatus (10) includes endless conveyor chains (30) having a plurality of elongated slats (70) attached along a portion thereof. The transversely extending slats (70) are moved in a spaced relationship by the endless chains (30) longitudinally of the trailer flat bed (12). The trailer flat bed (12) may be used either in a "live floor" configuration wherein the slats (70) are positioned along at least a portion of the top surface of the trailer flat bed (12) or in a conventional configuration wherein the slats (70) are positioned under the trailer flat bed (12) such that the top surface of the trailer flat bed (12) is generally void of any of the slats (70). Furthermore, the chains (30) are recessed in longitudinally extending recesses.

20 Claims, 7 Drawing Figures

REVOLVING FLOOR APPARATUS FOR TRAILERS

BACKGROUND OF THE INVENTION

The present invention relates to a revolving floor apparatus for use with trailers having a relatively flat bed such as semi trailers or agricultural trailers. More particularly, the present invention relates to a revolving floor apparatus wherein the trailer flat bed may either have a "live floor" configuration for automatic loading/unloading, or a stationary floor for loading/unloading in a conventional manner.

Flat bed trailers are extremely useful and versatile due to their large carrying capacity, capability of handling different types of loads, and interchangeability with different hauling tractors. Many flat bed trailers, semi trailers in particular, are often difficult to unload because of their extreme length and/or full enclosure, particularly when the load comprises fungible goods, etc. The unloading problem has been solved to some extent, at least with respect to certain type loads, by the development of apparatus capable of automatically moving the load longitudinally over the length of the trailer until it reaches a discharge point.

However, a common problem with such apparatus was that while the trailer flat bed was self-unloading, the use of the trailer flat bed was limited to loads which were suited to automatic unloading. Accordingly, the trailer was rendered incapable of carrying loads which did not lend themselves to unloading, examples of which are livestock and certain types of freight. Accordingly, the versatility of such trailers was lessened appreciably.

U.S. Pat. No. 3,831,785 of which the applicant is the patentee, discloses an automatic unloading apparatus for a trailer flat bed such as a semi trailer, which permits selective use of the original trailer bed with or without the unloading feature. This is accomplished by providing a conveying means running the length of the trailer on each side thereof, with the upper flights of the conveyor running at the level of the trailer bed. A plurality of elongated unloading slats are constructed and arranged to be received by the conveying means in spaced relation and to be moved over the length of the trailer flat bed transversely thereto. The slats are moved to a discharge point at the rear of the trailer, and then carried around and under the trailer flat bed where they are dropped one by one into a collecting box for further use. The trailer flat bed returns to normal use after all of the unloading slats have been dropped into the collecting box. The trailer flat bed is provided with the automatic unloading feature by stacking the elongated slats into a magazine disposed at the forward end of the trailer. A slat release mechanism then releases the slats one at a time to be picked up by the conveying means.

While the above-mentioned patent provides for a trailer flat bed that can either be used with an automatic unloading feature or used in the conventional manner, the apparatus is rather complex in that it requires several working parts in addition to the basic conveying means. In addition to others, a collecting box, a magazine, and a slat releasing mechanism are required. Furthermore, in order to transform the trailer flat bed from one configuration to another, the operator must manually stack the slats in the magazine for delivery by the release mechanism onto the conveying means.

In addition, the conveying means is configured for movement in one direction only. Accordingly, the conveying means cannot be used to automatically load the trailer flat bed.

Furthermore, the slats extend substantially the entire width of the trailer flat bed. Accordingly, due to the substantial spans involved, the slats are subject to being bent and/or the conveying means being damaged if excessive force is applied.

The present invention solves these and many other problems associated with currently available apparatus.

SUMMARY OF THE INVENTION

The present invention relates to a revolving floor apparatus for a trailer flat bed. The invention includes conveyor means suitably mounted along at least a portion of the top and bottom surfaces of the trailer flat bed for moving a plurality of spaced apart, elongated members longitudinally of the trailer flat bed, the elongated members extending generally transversely of the trailer flat bed. The conveyor means defines a first portion having the elongated members suitably attached thereto and a second portion generally void of the elongated members. The invention further includes means for moving the conveyor means between a first position and a second position, the first portion of the conveying means being positioned along at least a portion of the top surface of the trailer flat bed when the conveyor means is in the first position, the second portion of the conveying means being positioned along the top surface of the flat bed when the conveying means is in the first position, whereby the top surface of the trailer flat bed is generally void of the elongated members.

The present invention is particularly advantageous in that by simply rotating the conveying means between the first position and the second position, the trailer flat bed is converted from a "live floor" configuration having automatic unloading and/or loading capabilities to a stationary floor configuration for loading/unloading in a conventional manner wherein the conveying means and its associated elongated members do not interfere with the loading or unloading process. Accordingly, the trailer flat bed has much versatility in that it is capable of hauling loads which lend themselves to automatic unloading/loading and those loads which do not so lend themselves to automatic unloading/loading. For example, the same trailer flat bed incorporating the principles of the present invention, can be utilized to haul both fungible goods suitable for automatic unloading/loading and livestock or freight not suited to automatic unloading/loading.

Furthermore, the present invention is particularly easy to use in that the operator merely rotates the conveying means in order to transform the trailer flat bed into a "live floor" configuration or a conventional floor configuration. The need for additional equipment to remove and reposition the elongated members on the conveying means is done away with.

Furthermore, in one embodiment of the present invention, the conveyor means includes a plurality of chain pairs, each pair of the chains having spaced apart elongated members suitably attached thereto along a portion thereof. Accordingly, the elongated members do not extend across substantially the entire width of the trailer flat bed, enabling more force to be applied without damaging either the slats or the chains to which they are attached.

In addition, in yet another embodiment of the present invention, the chains are mounted on the trailer flat bed for movement either rearwardly or forwardly of the trailer flat bed. Accordingly, the present invention provides for both automatic loading and unloading of loads.

Furthermore, in yet another embodiment of the present invention, the elongated members are securedly attached to the conveying means such that they remain attached at all times during use.

In yet another embodiment of the present invention, the means for moving the conveyor means is positioned at the back end of the trailer flat bed. This enables the drive means to pull on the top flight of the chains when a load is being unloaded, thereby providing for more power.

The present invention is suited for use with both open trailer flat beds and enclosed trailer flat beds such as semi trailers. In one embodiment of the present invention, the drive mechanism is positioned in the walls of the semi trailer at the back end thereof.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
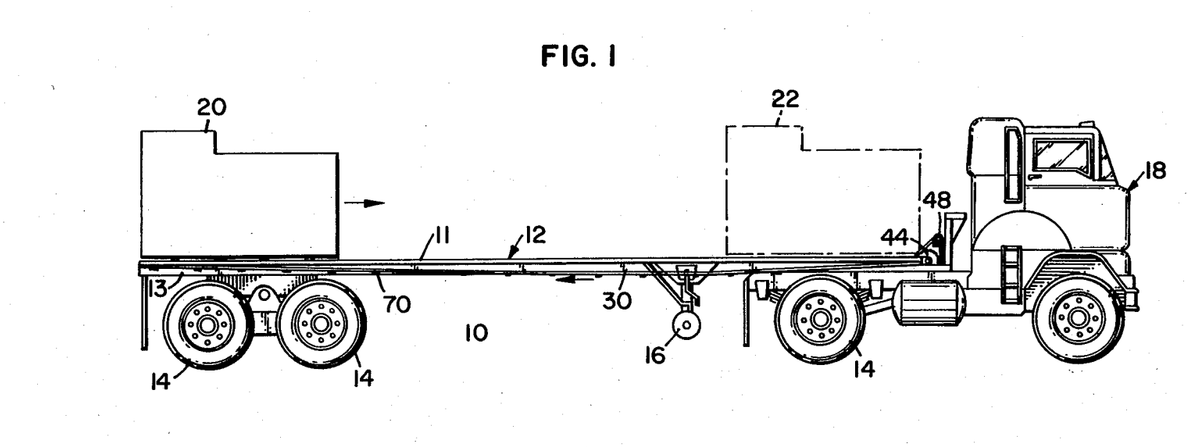
FIG. 1 is a side elevational view of a trailer flat bed including an embodiment of the revolving floor apparatus of the present invention.

Illustrated in FIG. 1, is a flat bed trailer incorporating the revolving floor apparatus of the present invention, the revolving floor apparatus being generally referenced by the numeral 10. The flat bed, generally designated by the numeral 12, includes a relatively flat rectangular platform 11 suitably supported by a frame structure 13 which in turn is mounted on a plurality of wheels 14. The trailer flat bed 12 is further shown as including a retractable front support wheel 16. The trailer flat bed 12 is suitably hitched to a tractor 18 by a conventional hitch apparatus. Illustrated on the trailer flat bed 12 is a load 20. The broken lines 22 represent the possible position of the load 20 after being moved forwardly by the revolving floor apparatus 10 of the present invention.

Figure 2:
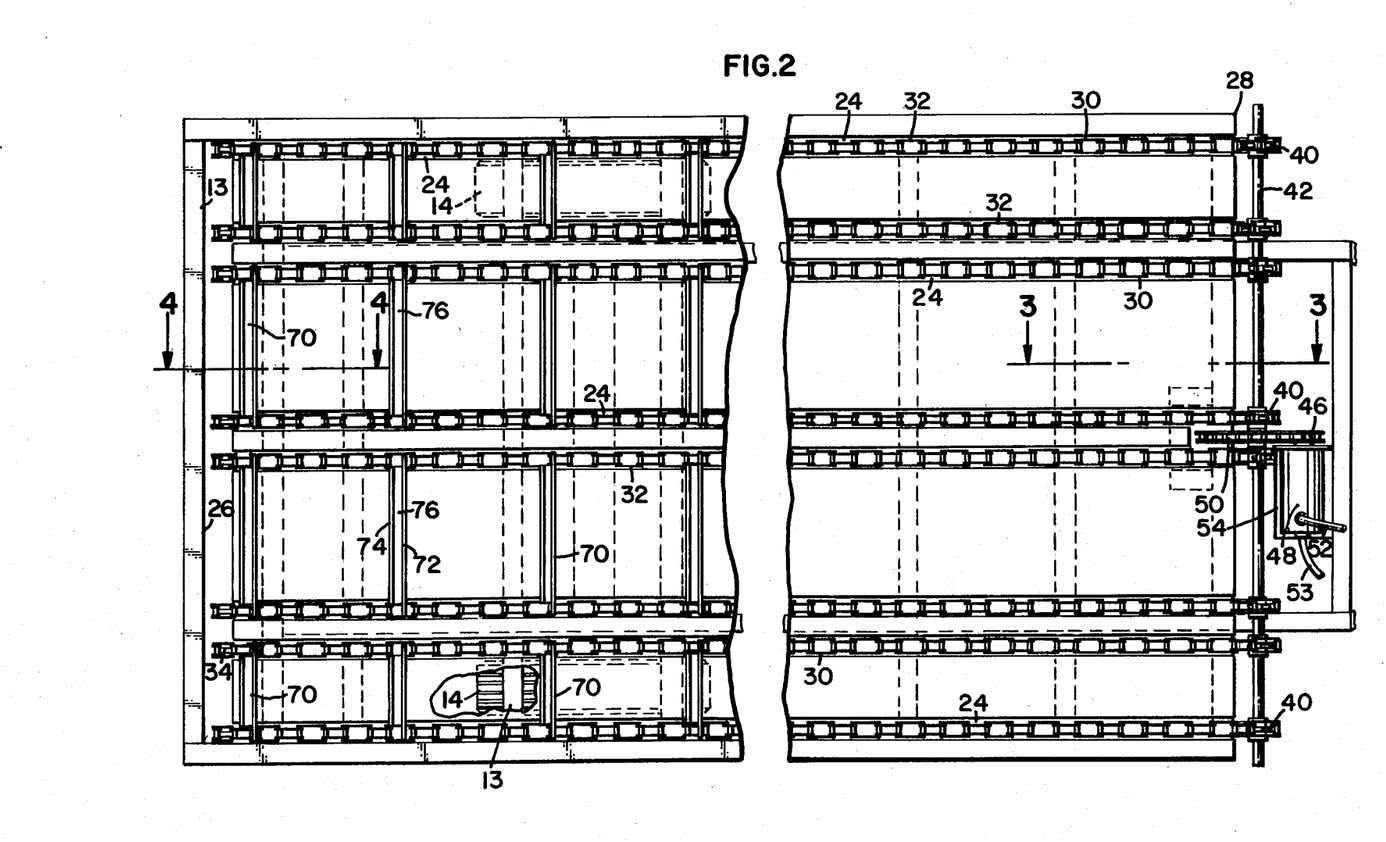
FIG. 2 is a top plan view of the embodiment of the present invention shown in FIG. 1.
Figure 3:
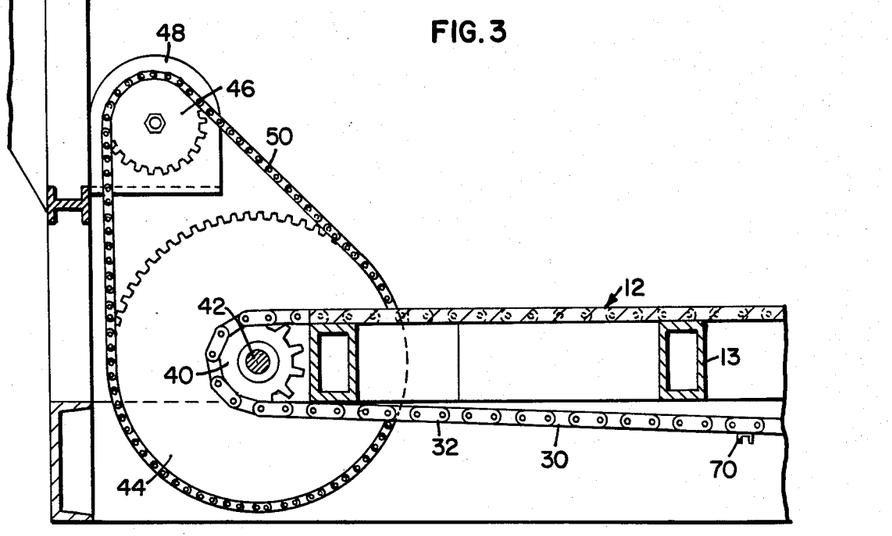
FIG. 3 is a view taken along line 3—3 in FIG. 2.
Figure 4:
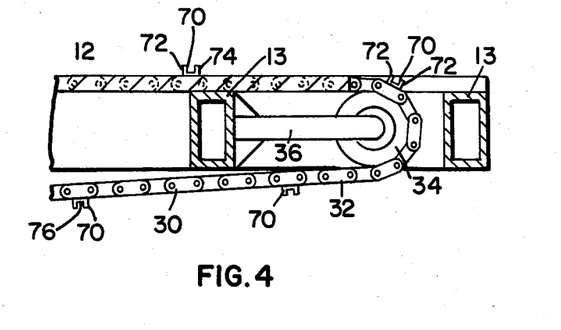
FIG. 4 is a view taken along line 4—4 in FIG. 2.

More particularly, as illustrated in FIGS. 2 through 4, the trailer flat bed 12 has a plurality of recesses 24 in the top surface thereof which extend longitudinally of the trailer flat bed 12 generally from a trailer back end 26 to a trailer front end 28. The recesses 24 have a generally U-shaped cross-sectional configuration and extend generally parallel of one another.

In the preferred embodiment, it will be noted that there are four pairs of recesses 24 although it will be appreciated that alternate embodiments of the present invention might display varying numbers of the recesses 24. Disposed within each of the elongated recesses 24 is the upper flight of an endless chain 30 which is adapted to slide in the recesses 24 along the top surface of the trailer flat bed 12. Each of the chains 30 comprises a plurality of pivotally connected links 32 which in the preferred embodiment, enable the chains to move either forwardly or rearwardly of the trailer flat bed 12.

In the embodiment shown, each of the endless chains 30 extends generally about the back end 26 of the trailer flat bed 12 and is supported relative thereto by an idler sprocket 34 as generally illustrated in FIG. 4. The idler sprocket 34 is suitably connected to the frame structure 13 of the trailer flat bed 12 by a suitable support structure 36. As illustrated in FIG. 4, the idler sprocket 34 need not be attached to the rearmost edge of the frame structure 13 and may be located at varying distances forwardly thereof. Preferably, the idler sprocket 34 will be attached just forwardly of the rearmost edge of the trailer flat bed 12 such that the back end 26 of the trailer flat bed 12 will provide some protection for the idler sprocket 34.

Each of the endless chains 30 moves around the front end 28 of the trailer flat bed 12 and is supported relative thereto by a drive sprocket 40 suitably attached to a drive shaft 42. Also attached to the drive shaft 42 is a larger drive sprocket 44 as generally illustrated in FIG. 3. The drive sprocket 44 is interconnected to a sprocket 46 on a hydraulic motor 48 by a drive chain 50. The hydraulic motor 48 is suitably connected by hydraulic fluid lines 52,53 to a source of hydraulic fluid (not shown) for operation of the hydraulic motor 48. The hydraulic motor 48 is suitably attached to a vertically extending bracket 54 which in turn is suitably attached to the trailer flat bed front end 28.

Figure 7:
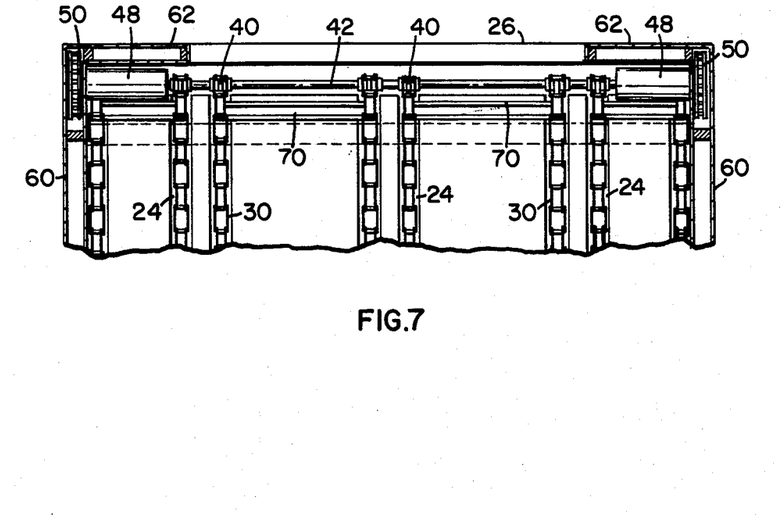

Although the hydraulic motor 48 and the associated drive sprockets 40,44 and 46 are illustrated in FIG. 3 as being mounted at the front end 28 of the trailer flat bed 12. In yet other embodiments of the present invention, particularly in semi trailer applications, the hydraulic motor 48 and the associated drive sprockets 40,44,46 are positioned at the back end 26 of the trailer flat bed 12 as generally illustrated in FIG. 7. FIG. 7 illustrates a semi trailer application wherein the drive sprockets 40,44,46 are mounted in vertical walls 60 of the semi trailer. The hydraulic motor 48 is suitably mounted on the walls 60 while the drive shaft 42 extends transversely of the trailer flat bed 12 slightly forward of a back wall 62. In particular, there is one of the hydraulic motors 48 mounted at each end of the drive shaft 42 adjacent the vertical side walls 60. This enables the drive sprockets 40,44,46 to be positioned within the vertical side walls 60 while providing for even more power to be exerted on the endless chains 30. As with the previous embodiment disclosed in FIGS. 1 through 3, the hydraulic motors 48 are suitably connected to a hydraulic fluid source (not shown). It will be appreciated that by being positioned inside the semi trailer, the drive apparatus of the present invention is less likely to be subject to damage and wear due to accidental impact with other objects and exposure to the elements. It will further be appreciated, that in the embodiment shown in FIG. 7, the idler sprockets 34 and suitable support structure will be located at the front end 28 of the trailer flat bed 12.

A particularly advantageous feature of the embodiment shown in FIG. 7 is that the drive sprocket 40 is pulling on the top flight of the chains 30 when unloading the semi trailer. This enables more power to be exerted on the conveying chains.

The lower flight of the endless chain 30 extends below the trailer flat bed 12. Although not shown, it will be appreciated that additional idler sprockets and guide mechanisms may be provided along the bottom of the trailer flat bed 12 to assure proper movement of the endless chains 30.

As illustrated in FIGS. 1 through 4, operating in association with the endless chains 30 are a plurality of individual elongated members or slats 70. The slats 70 are of a generally U-shaped cross-section, preferably formed from a suitable metal. The length of each of the slats 70 is approximately that of the spacing between the endless chains 30 in a pair. The slats 70 extend transversely of the trailer flat bed 12 between the chains 30 in a chain pair and are suitably attached to the top of the chains whereby movement of the chains 30 causes the slats 70 to move along the top surface of the trailer flat bed 12. As illustrated in FIG. 2, in the preferred embodiment, the slats include two generally vertically extending wall portions 72,74 and a relatively flat horizontal bottom portion 76. Preferably one of the wall portions 72,74 and the bottom portion 76 are cut away near the ends of each of the slats such that only one of the wall portions 72,74 is attached to the top of the chains 30. This assists in maintaining the flexibility of the chains 30 and assuring that the slats 70 do not interfere with the drive sprocket 40. In the preferred embodiment, the slats 70 are welded to the top of the chain links 32.

Figure 5:
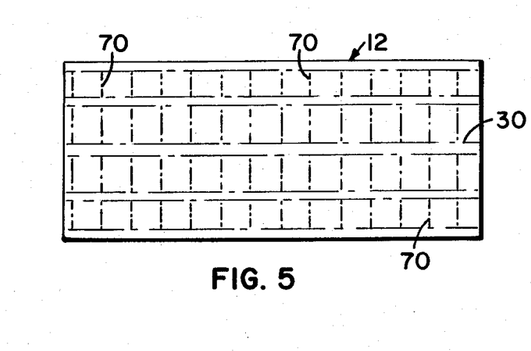
FIG. 5 is a top plan diagrammatic view illustrating the trailer flat bed in a "live floor" configuration.

As illustrated in FIGS. 1 and 2, the slats 70 do not extend along the entire length of the endless chains 30. Indeed, the slats 70 are spaced apart at generally regular intervals for approximately one-half of the total length of the endless chains 30 with the other half of the endless chains 30 being generally void of any of the slats 70. Since the upper flights of the endless chains 30 do not extend above the top surface of the trailer flat bed 12 when in the recesses 24 but are generally flush or even slightly below the surface of the trailer flat bed 12, the endless chains 30 and their associated slats 70 provide the trailer flat bed 12 with two basic configurations. As illustrated in FIG. 5, when the slats 70 are positioned along the upper flight of the endless chains 30, the trailer flat bed 12 is provided with a "live floor" configuration enabling automatic loading/unloading of loads. This is accomplished by activating the hydraulic motor 48 which, in cooperation with the drive sprockets, drives the endless chains 30 longitudinally of the trailer flat bed. Accordingly, as the drive chains 30 move, the slats 70 are also caused to move thereby conveying any loads positioned thereon either rearwardly or forwardly of the trailer flat bed 12.

Figure 6:
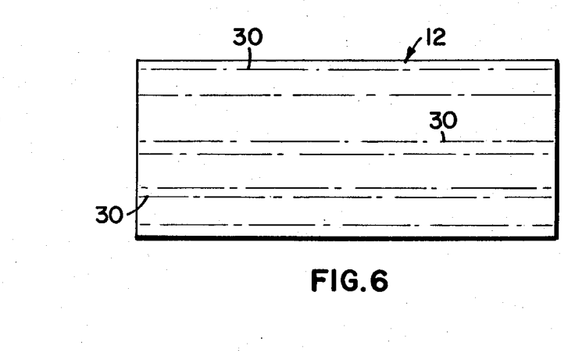
FIG. 6 is a top plan diagrammatic view illustrating the trailer falt bed in a conventional configuration; and, FIG. 7 is a fragmentary top plan view of an alternate embodiment of the present invention illustrating the drive mechanism located at the rear end of an enclosed trailer flat bed.

As illustrated in FIG. 6, when the slats 70 are positioned along the lower flight of the endless chains 30 below the trailer flat bed 12, the trailer flat bed 12 is provided with a conventional configuration for loading/unloading in a conventional manner. As the endless chains 30 are recessed in the recesses 24, neither they nor the idler sprockets 34 nor the drive shaft 42 interfere with the loading/unloading process.

Although in the preferred embodiment, the endless chains 30 are capable of movement either rearwardly or forwardly of the trailer flat bed 12, it will be appreciated that chains might be utilized which are capable of movement in only one direction. Furthermore, the chains 30 need not extend the entire length of the trailer flat bed 12.

The present invention is particularly advantageous in that it provides a trailer flat bed with a substantial amount of versatility when hauling various types of loads. For example, in the conventional floor configuration, the trailer flat bed 12 can be utilized live stock or certain types of freight, while in the "live floor" configuration, the trailer flat bed 12 may be utilized to haul fungible goods or the like which are otherwise difficult to unload by conventional methods due to the excessive length of the trailer flat bed or the fact that the trailer flat bed is enclosed.

Furthermore, in the preferred embodiment of the present invention, multiple pairs of conveyor chains are utilized which increases the force that may be applied to the conveyor chains as the force is being distributed amongst the plurality of chains and the length of the slats 70 is reduced making it less likely that they will bend and/or cause damage to the chains 30 when moving a load.

The present invention is particularly advantageous in that it is simple to use and requires relatively few moving parts. As the slats 70 remain attached to the conveyor chains at all times, there is no requirement for an operator to position loose slats in a loading magazine for placement on the conveyor chains 30. When the operator wishes to use the trailer flat bed in the "live floor" configuration, the endless chains 30 are merely rotated until that portion of the conveyor chains 30 having the slats 70 suitably attached thereto is positioned over the top surface of the trailer bed 12. Accordingly, when wishing to use the trailer flat bed 12 in its conventional configuration, the operator merely causes the chains 30 to rotate about the flat bed until the slats 70 are positioned along the bottom flight of the clains under the bottom of the flat bed.

It is to be understood, however, that even though numerous characteristics and advantageous of the invention have been set forth in the foregoing description, together with details of the structure and function of the invention, the disclosure is illustrative only, and changes may be made in detail, especially in matters of shape, size, and arrangement of the parts within the principle of the invention, to the full extent indicated by the broad general meaning of the terms in which the appended claims are expressed.

What is claimed is:

1. A revolving floor apparatus for a trailer flat bed, comprising:
   (a) conveyor means suitably mounted along at least a portion of the top and bottom surfaces of the trailer flat bed for moving a plurality of spaced apart, elongated members longitudinally of the trailer flat bed, said elongated members extending generally transversely of the trailer flat bed, said conveyor means defining a first portion having said elongated members suitably attached thereto and a second portion generally being void of said elongated members; and (b) means for moving said conveyor means between a first position and a second position, said elongated members being attached to said conveyor means and positioned along at least a portion of the top surface of the trailer flat bed when said conveyor means is in said first position, said elongated members being attached to said conveyor means and positioned below the bottom surface of the trailer flat bed in said second position, the top surface of the trailer flat bed being generally void of said elongated members when said conveyor means is in said second position.

2. A revolving floor apparatus in accordance with claim 1, wherein said conveyor means is endless, said conveyor means defining an upper flight movable over the top surface of the trailer flat bed and a lower flight movable below the bottom surface of the trailer flat bed.

3. A revolving floor apparatus in accordance with claim 1, wherein said conveyor means is constructed for movement of the elongated members both forwardly and rearwardly along the top surface of the trailer flat bed.

4. A revolving floor apparatus in accordance with claim 1, wherein said elongated members are fixedly secured to said conveyor means.

5. A revolving floor apparatus in accordance with claim 2, wherein said conveyor means includes a plurality of individual conveyor pairs each including said first and second conveyors spaced apart in a parallel relationship, said first and second conveyors of each of said conveyor pairs being interconnected along a portion thereof by said elongated members.

6. A revolving floor apparatus in accordance with claim 5, wherein said trailer flat bed includes a plurality of channel-like structures, each of said channel-like structures being adapted for receipt of one of said first and second conveyors, said first and second conveyors being disposed along the upper flights thereof in said channel-like structures, said elongated members being suitably attached to the top portion of said first and second conveyors so as to slide along the top surface of the trailer flat bed when positioned along said upper flights of said first and second conveyors.

7. A revolving floor apparatus in accordance with claim 1, wherein said conveyor means is constructed for movement of the elongated members rearwardly along the top surface of the trailer flat bed.

8. A revolving floor apparatus in accordance with claim 1, wherein said means for moving said conveyor means includes a hydraulic motor interconnected to said conveyor means.

9. A revolving floor apparatus in accordance with claim 1, wherein said conveyor means includes bi-directional chains capable of being moved both forwardly and rearwardly of the trailer flat bed.

10. A trailer flat bed, comprising:
(a) a platform suitably mounted on a frame structure, said platform having first and second conditions, said platform in said first condition including trasversely extending elongated members suitably mounted on conveyor means for movement along a top surface of said platform, the top surface of said platform being void of said elongated members in said second condition;

(b) said conveyor means suitably mounted along at least a portion of the top and bottom surfaces of the platform and including a pair of endless spaced apart, parallel conveyors interconnected by said elongated members along a first portion thereof, said conveyors being void of said elongated members along a second portion thereof, said elongated members being fixedly secured to said conveyors;

(c) means mounted on the frame structure for moving said conveyor means between a first position and a second position, said elongated members being attached to said conveyor means and positioned along at least a portion of the top surface of the platform when said conveyor means is in said first position, wherein said platform is in said first condition, said elongated members being attached to said conveyor means and positioned below the bottom surface of the platform in said second position, the top surface of the platform being generally void of said elongated members when said conveyor means is in said second position, wherein said platform is in said second condition;

(d) said platform including said spaced apart parallel recesses in the top surface thereof, said recesses extending longitudinally of the platform and being adapted for receipt of said conveyors.

11. A trailer flat bed in accordance with claim 10, wherein said conveyor means includes a plurality of said conveyor pairs each including first and second conveyors interconnected along a first portion thereof by said elongated members, said conveyor pairs being void of said elongated members along a second portion thereof.

12. A trailer flat bed in accordance with claim 11, wherein said conveyor means includes a single drive shaft interconnected to said conveyors for movement of said conveyors.

13. A trailer flat bed in accordance with claim 11, wherein said first and second conveyors include roller chains capable of being moved forwardly or rearwardly of the platform.

14. A trailer flat bed in accordance with claim 12, wherein said drive shaft is positioned at a back end of said platform, said drive shaft interacting with said conveyors to pull said conveyors toward said drive shaft when unloading a product from the platform.

15. A trailer flat bed in accordance with claim 10, wherein said conveyors do not project above the top surface of said platform when positioned in said recesses.

16. A trailer flat bed, comprising:
(a) a relatively flat, rectangular platform suitably mounted on a frame structure, said platform defining top and bottom surfaces, said platform being supported above the surface of the ground by a plurality of wheels;

(b) conveyor means suitably mounted along at least a portion of the top and bottom surfaces of said platform for moving a plurality of spaced apart, elongated members longitudinally of said platform, said elongated members extending generally transversely of said platform, said conveyor means defining a first portion having said elongated members suitably attached thereto and a second portion generally being void of said elongated members; and (c) means mounted on the frame structure for moving said conveyor means between a first position and a second position, said elongated members being attached to said conveyor means and positioned along at least a portion of the top surface of said platform when said conveyor means is in said first position, said elongated members being attached to said conveyor means and positioned below the bottom surface of said platform in said second position, the top surface of said platform being generally void of said elongated members when said conveyor means is in said second position.

17. A trailer flat bed in accordance with claim 16, wherein said conveyor means includes a plurality of conveyor pairs, each of said conveyor pairs including endless first and second chains spaced apart in a generally parallel arrangement, said first and second chains extending along at least a portion of the top and bottom surfaces of the platform, said first and second chains of each conveyor pair being interconnected along a portion thereof by said elongated members.

18. A trailer flat bed in accordance with claim 17, wherein said first and second chains are received in longitudinally extending grooves on the top surface of said platform, said first and second chains not extending above the top surface of said platform.

19. A trailer flat bed in accordance with claim 18, wherein said elongated members are suitably attached to the top of said first and second chains, said elongated members sliding along the top surface of said platform as said first and second chains are moved longitudinally thereof.

20. A trailer flat bed in accordance with claim 16, wherein said means for moving said conveyor means includes a hydraulic motor power source, said hydraulic motor being suitably interconnected to a sprocket drive apparatus which is in turn suitably connected to said first and second chains of said conveyor pairs.

* * * * *

UNITED STATES PATENT AND TRADEMARK OFFICE
CERTIFICATE OF CORRECTION

PATENT NO. : 4,505,634

DATED : March 19, 1985

INVENTOR(S) : Howard D. Rezac

It is certified that error appears in the above-identified patent and that said Letters Patent is hereby corrected as shown below:

In Column 6, line 17 after "utilized" insert --for--.

In Column 7, lines 63-64 change "trasversely" to --transversely--.

Signed and Sealed this

Seventh Day of January 1986

[SEAL]

Attest:

DONALD J. QUIGG

Attesting Officer

Commissioner of Patents and Trademarks